United States Patent Office 3,591,587
Patented July 6, 1971

3,591,587
HETEROCYCLIC SUBSTITUTED-CHLORINATED METHANONAPHTHALENE COMPOUNDS
Carleton W. Roberts, Midland, and Gale D. Travis, Shepherd, Mich., assignors to The Dow Chemical Company, Midland, Mich.
No Drawing. Continuation-in-part of application Ser. No. 434,709, Feb. 23, 1965. This application Oct. 31, 1968, Ser. No. 772,404
Int. Cl. C07d 87/36
U.S. Cl. 260—247.2    3 Claims

ABSTRACT OF THE DISCLOSURE 7-substituted 1,2,3,4,9,9 - hexachloro-1,4,4a,5,6,7,8,8a-octahydro-1,4-methanonaphthalene-6,7-dicarboxylic acid derivatives bearing a heterocyclic substituent such as a morpholino, piperidino or pyrrolidinyl on the 7-carbonyl radical are disclosed as novel compounds useful as parasiticides and anthelmintics.

CROSS-REFERENCE TO RELATED APPLICATIONS

This is a continuation-in-part of our copending application, Ser. No. 434,709, filed Feb. 23, 1965, now U.S. Pat. No. 3,440,248.

SUMMARY OF THE INVENTION

The present invention is concerned with chlorinated methanonaphthalene compounds and is particularly directed to the novel 7-substituted 1,2,3,4,9,9-hexachloro-1,4,4a,5,6,7,8,8a - octahydro - 1,4 - methanonaphthalene-6,7-dicarboxylic acid derivatives bearing a nitrogen containing heterocyclic group such as morpholino, piperidino, pyrrolidinyl or substituted derivatives of these heterocyclic materials on the 7-carbonyl radical. The new compounds may be represented by the formula

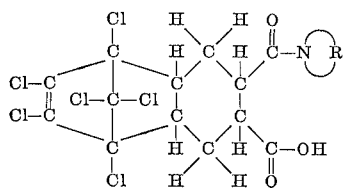

wherein R is a divalent radical which, with the nitrogen atom to which it is bonded, constitutes a radical selected from the group consisting of piperidino, morpholino, 1-pyrrolidinyl and lower alkyl-substituted derivatives of these heterocyclic compounds. In the present specification and claims, the term "lower alkyl" is employed to designate straight chain alkyl radicals of from 1 to 4 carbon atoms, inclusive. These radicals include methyl, ethyl, propyl and butyl.

The products of the present invention are normally solids, somewhat soluble in various organic solvents and of low solubility in water. The novel products are useful as parasiticides and anthelmintics.

The compounds of the invention may be prepared by reacting 1,2,3,4,9,9 - hexachloro-1,4,4a,5,6,7,8,8a-octahydro - 1,4-methanonaphthalene-6,7-dicarboxylic anhydride with a nitrogen-containing heterocyclic compound, i.e., aza type heterocyclic compound, such as morpholine, piperidine, pyrrolidine and substituted derivatives of these heterocyclic compounds. The reaction of the anhydride reactant and the aza type heterocyclic compound reactant conveniently is carried out in the presence of an inert liquid reaction medium. The employment of such medium or the identity of the inert liquid employed is not critical; however, the use of such a medium provides for better dispersion and contacting of the reactants and is therefore preferred. Representative suitable inert liquids include, for example, hydrocarbons such as benzene, hexane and toluene; chlorinated hydrocarbons, such as dichloromethane; ethers; ketones such as acetone; and N,N-disubstituted amides, such as dimethylformamide. Preferably, acetone or dimethylformamide is employed as the inert liquid reaction medium.

The reaction of the anhydride reactant and the heterocyclic reactant is carried out at a temperature range of from about 0° C. to about 90° C. and is preferably conducted at room temperatures. The reaction goes forward under pressures of a wide range; however, no advantage ordinarily results from the use of subatmospheric or superatmospheric pressures, and, therefore, the preparation is ordinarily carried out at atmospheric pressure.

The amount of the reactants to be employed is not critical, some of the desired product resulting when the reactants are employed in any amount. However, in the preparation of said products the reactants are consumed in amounts which represent equimolecular proportions. Thus it is usually preferred to supply the anhydride reactant and the aza-heterocyclic reactant in amounts representing equimolecular proportions. However, since the nitrogen atom of the amide functional group of the compounds of the invention is a tertiary nitrogen atom, the reaction sequence cannot proceed to the formation of undesired imide compounds even in the presence of excess aza-heterocyclic reactant.

It is sometimes preferred to permit the reaction mixture to stand for a period of time in order to assume completion of the reaction. Separatory and purification procedures can be carried out following completion of the reaction, or when the reactants have been contacted for a predetermined period of time. The separated product can be employed for the useful purposes of the present invention, or can be purified by conventional procedures before being so employed. Representative purification procedures include washing with an appropriate liquid which is a solvent for impurities but no for the product, recrystallization and the like.

DESCRIPTION OF PREFERRED EMBODIMENTS

The following examples illustrate the invention but are not to be construed as limiting the same.

EXAMPLE 1

7-(morpholinocarbonyl)-1,2,3,4,9,9-hexachloro-1,4,4a,5,6,7,8,8a-octahydro-1,4-methanonaphthalene-6-carboxylic acid 1,2,3,4,9,9-hexachloro-1,4,4a,5,6,7,8,8a-octahydro - 1,4-methanonaphthalene - 6,7 - dicarboxylic anhydride (42.5 grams; 0.1 mole) and morpholine (8.71 grams; 0.1 mole) are mixed together in 50 milliliters of dimethylformamide at room temperature to prepare a reaction mixture. The reaction mixture is held at room temperature for 15 minutes, during which an exotherm is noted. Thereafter, the reaction mixture is heated to reflux temperature and held thereat for a period of 16 hours.

The heated reaction mixture is cooled to room temperature and diluted with 400 milliliters of ice and water at a temperature of about 0° C., to obtain the 7-(morpholinocarbonyl)-1,2,3,4,9,9-hexachloro-1,4,4a,5,6,7,8,8a-octahydro - 1,4 - methanonaphthalene-6-carboxylic acid products as a precipitate in the reaction mixture. The diluted mixture is permitted to stand for 16 hours; the product residue is thereafter separated from the mixture by filtration. The filtered product is washed with 100 milliliters of cold water and dried by being held under subatmospheric pressure at a temperature of 100° C. for 24 hours. The dried product is recrystallized from toluene.

In a representative preparation, the 7-(morpholinocarbonyl)-1,2,3,4,9,9-hexachloro-1,4,4a,5,6,7,8,8a-octahydro-1,4-methanonaphthalene-6-carboxylic acid was found to melt at 206–209° C. Elemental analysis showed: C, 39.28%; H, 3.32%; N, 2.81%; and Cl, 44.64%; calculated for $C_{17}H_{17}Cl_6NO_4$; C, 39.87%; H, 3.34%; N, 2.73%; and Cl, 41.54%.

EXAMPLE 2

7 - (piperidinocarbonyl)-1,2,3,4,9,9-hexachloro-1,4,4a-5,6, 7,8,8a-octahydro-1,4-methanonaphthalene-6-carboxylic acid Following the procedural steps of Example 1, 8.5 grams (0.1 mole) of piperidine is reacted with 42.5 grams (0.1 mole) of the dicarboxylic anhydride in 50 milliliters of dimethylformamide at room temperature. The crude product, isolated as in Example 1, is recrystallized from toluene to obtain the 7-(piperidinocarbonyl)-1,2,3,4,9,9-hexachloro - 1,4,4a,5,6,7,8,8a-octahydro-1,4-methanonaphthalene-6-carboxylic acid product as a solid, melting at 207–210° C. Elemental analysis showed: C, 39.13%; H, 3.40%; N, 2.73%; and Cl, 44.61%; calculated for $C_{18}H_{19}Cl_6NO_3$; C, 42.38%; H, 3.75%; N, 2.75%; and Cl, 41.70%.

EXAMPLE 3

7-(1 - pyrrolidinylcarbonyl)-1,2,3,4,9,9-hexachloro-1,4,4a, 5,6,7,8,8a-octahydro-1,4-methanonaphthalene-6-carboxylic acid 42.5 grams (0.1 mole) of 1,2,3,4,9,9-hexachloro-1,4,4a, 5,6,7,8,8a - octahydro-1,4-methanonaphthalene-6,7-dicarboxylic anhydride and 7.11 grams (0.1 mole) at pyrrolidine are dispersed together in 50 milliliters of dimethylformamide at room temperature. The crude product is separated and purified as in Example 1 and recrystallized from toluene to obtain the 7-(1-pyrrolidinylcarbonyl)-1,2,3,4,9,9-hexachloro - 1,4,4a,5,6,7,8,8a - octahydro-1,4-methanonaphthalene-6-carboxylic acid product as a solid, melting at 213–216° C. Elemental analysis showed: C, 40.00%; H, 3.44%; N, 2.98%; and Cl, 43.84%; calculated for $C_{17}H_{17}Cl_6NO_3$; C, 41.14%; H, 3.45%; N, 2.82%; and Cl, 42.88%.

In view of the foregoing teachings and examples, the following compounds are prepared from the indicated starting materials in accordance with the above described methods:

From 1,2,3,4,9,9 - hexachloro-1,4,4a,5,6,7,8,8a-octahydro-1,4 - methanonaphthalene-6,7-dicarboxylic anhydride and 2,6-dimethyl piperidine, 7-((2,6-dimethylpiperidino) carbonyl)-1,2,3,4,9,9 - hexachloro - 1,4,4a,5,6,7,8,8a-octahydro-1,4-methanonaphthalene-6-carboxylic acid product melting, with decomposition, at 120° C. Elemental analysis showed: C, 39.13%; H, 3.39%; N, 2.70%; and Cl, 44.61%; calculated for $C_{20}H_{23}Cl_6NO_3$, C, 44.63%; H, 4.31%; N, 2.60%; and Cl, 39.70%.

From 1,2,3,4,9,9-hexachloro-1,4,4a,5,6,7,8,8a - octahydro - 1,4-methanonaphthalene-6,7-dicarboxylic anhydride and 2,2-diethylpyrrolidine, 7-((2,2-diethyl-1-pyrrolidinyl) carbonyl)-1,2,3,4,9,9 - hexachloro - 1,4,4a,5,6,7,8,8a-octahydro-1,4-methanonaphthalene-6-dicarboxylic acid product having a molecular weight of 552.2.

From 1,2,3,4,9,9 - hexachloro-1,4,4a,5,6,7,8,8a-octahydro - 1,4-methanonaphthalene-6,7-dicarboxylic anhydride and 2,6-di-n-propylmorpholine, 7-((2,6-di-n-propylmorpholino)carbonyl) - 1,2,3,4,9,9-hexachloro-1,4,4a,5,6,7,8, 8a - octahydro-1,4-methanonaphthalene-6-carboxylic acid product having a molecular weight of 596.3.

From 1,2,3,4,9,9-hexachloro-1,4,4a,5,6,7,8,8a - octahydro - 1,4-methanonaphthalene-6,7-dicarboxylic anhydride and 3-n-butylpyrrolidine, 7-((3-n-butyl - 1 - pyrrolidinyl) carbonyl)-1,2,3,4,9,9-hexachloro-1,4,4a,5,6,7,8,8a-octahydro - 1,4 - methanonaphthalene-6-carboxylic acid product having a molecular weight of 552.2.

The products of the present invention are useful as parasiticides for the control of insects, such as, for example, plum curculio and as anthelmintics for the control of swine roundworm and mouse trichostrongylid. For the former use, the chemical may be a liquid or a solid which is formulated in an aqueous composition, which facilitates distribution of a toxic amount on the organism to be controlled or its habitat. As an anthelmintic, the compounds are included in the host animals' feed and the medicated diet is presented to the diseased animals during the treatment period.

In representative procedures, 7-(piperidinocarbonyl)-1, 2,3,4,9,9-hexachloro - 1,4,4a,5,6,7,8,8a - octahydro - 1,4-methanonaphthalene-6-carboxylic acid is employed as an anthelmintic for the eradication of pig ascarids in animals. In these procedures, a medicated diet is prepared containing the specified product as sole active agent at a concentration of 6.0% by weight. Animals used in the test method are female white mice infested with parasitic pig ascarids. On Day 0, the mice are weighed and placed in a cage. On Day 1, the white mice are inoculated via stomach tubes with a standardized culture of Ascaris suum ova (swine roundworm). A medicated diet containing the specified product is presented to the mice for seven days, at which time they are again weighed and sacrificed for necropsy. Intestinal tracts and lungs from the mice are collected and observations for the presence of Ascaris suum are recorded as relative numbers compared to untreated, infected controls. Ninety-five percent (95%) kill and control (anthelmintic activity) of the tested parasite is observed in the mice which had been fed the medicated diet, while the untreated controls show no reduction in the presence of pig ascarids.

The 1,2,3,4,9,9-hexachloro-1,4,4a,5,6,7,8,8a-octahydro-1,4-methanonaphthalene-,6,7-dicarboxylic anhydride employed as a starting material in the preparation of the compounds of the present invention is itself prepared in known procedures which comprise the Diels-Alder type reaction of hexachlorocyclopentadiene and tetrahydrophthalic anhydride at a temperature of 150–200° C. Preferably, the reaction is carried out in an inert liquid reaction media, for example, a hydrocarbon such as heptene, toluene, xylene, or ethylbenzene, or a halogenated hydrocarbon, such as chlorobenzene or dichlorobenzene. The reactants are consumed in equimolecular amounts, and are preferably supplied in such amounts. The desired anhydride is obtained as a precipitate in the reaction mixture; this product precipitate can be separated from the reaction mixture, preferably by filtration, and, if desired. purified, as by recrystallization from a suitable solvent.

What is claimed is:

1. A compound of the formula

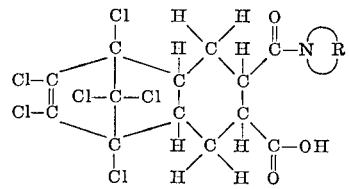

wherein R is a divalent radical which, with the nitrogen atom to which it is bonded, constitutes a radical selected from the group consisting of piperidino, morpholino, 1-pyrrolidinyl and straight chain lower alkyl substituted derivatives of these nitrogen containing heterocyclic compounds.

2. The compound of claim 1 wherein R, with the nitrogen atom to which it is bonded, constitutes morpholino; 2,6-di-n - propylmorpholino; piperidino; 2,6 - dimethylpiperidino; 1-pyrrolidinyl; 3-n-butyl-1-pyrrolidinyl; or 2,2-diethyl-1-pyrrolidinyl.

3. The compound of claim 1 wherein R, with the nitrogen atom to which it is bonded, constitutes piperidino, morpholino, or 1-pyrrolidinyl.

References Cited

UNITED STATES PATENTS 3,152,172  10/1964  Roberts et al. _____ 260—468

HENRY R. JILES, Primary Examiner

G. T. TODD, Assistant Examiner

U.S. Cl. X.R.

260—294, 326.3